Aug. 7, 1951 N. L. DOLBEY 2,563,458
APPARATUS FOR TREATING ASBESTOS FIBER
Original Filed July 7, 1945 2 Sheets-Sheet 1
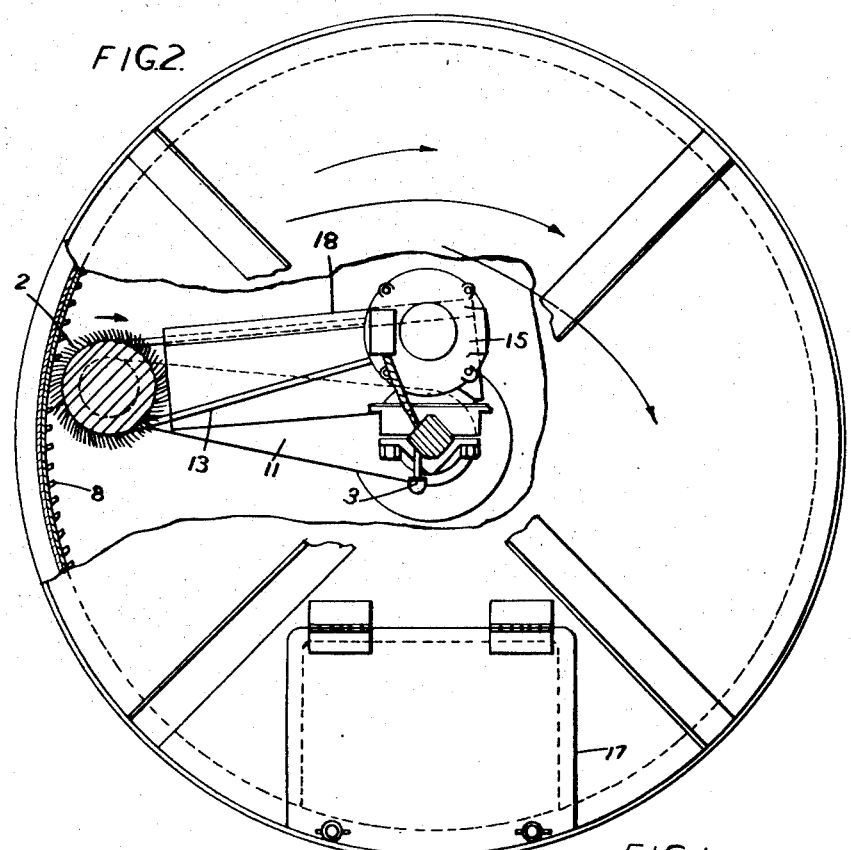
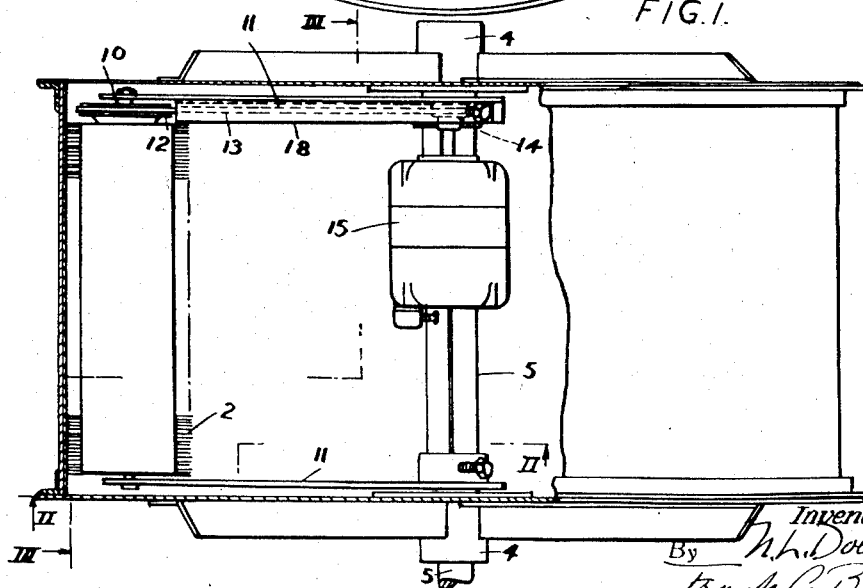

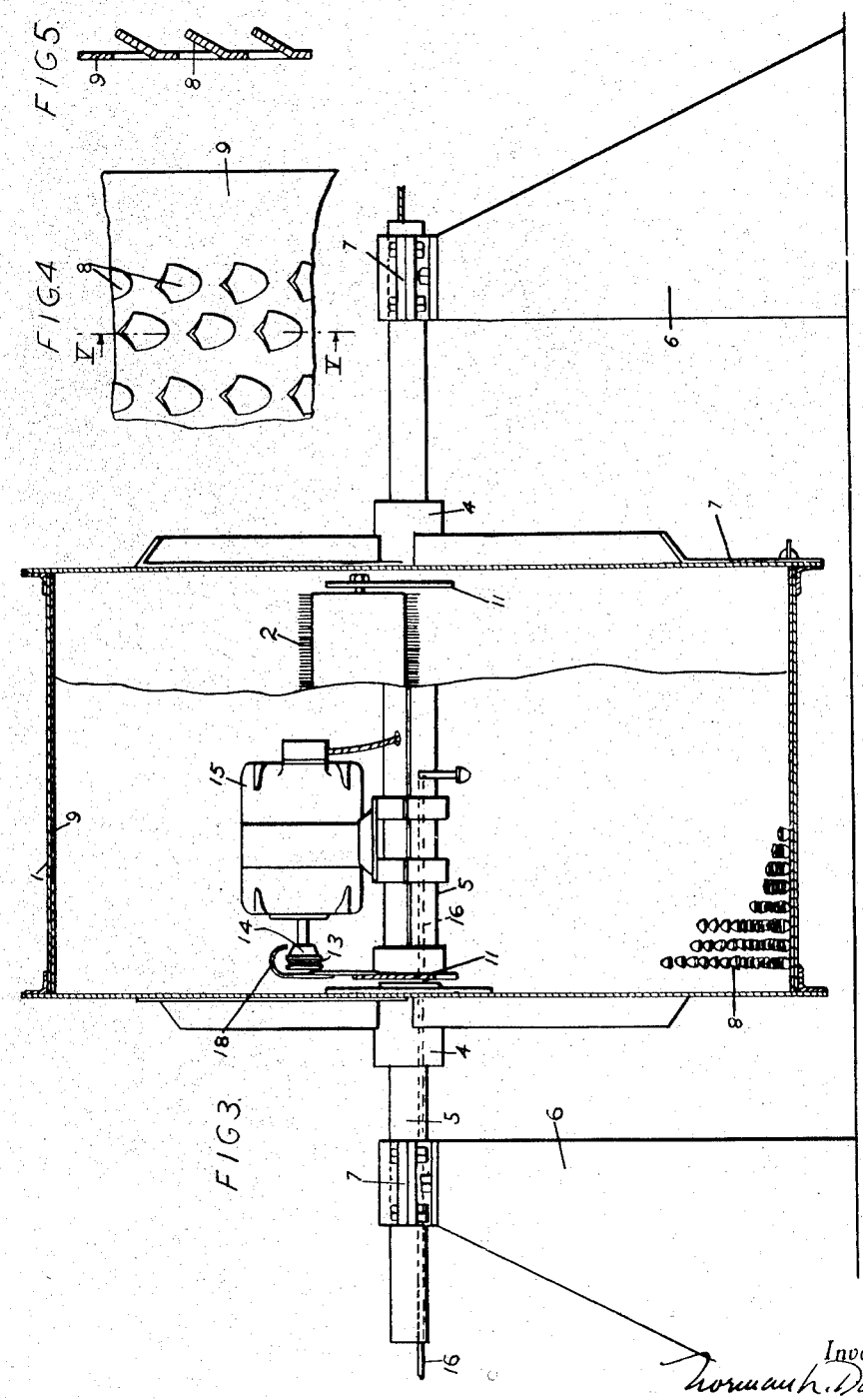

Patented Aug. 7, 1951

2,563,458

UNITED STATES PATENT OFFICE 2,563,458

APPARATUS FOR TREATING ASBESTOS FIBER

Norman Louis Dolbey, Leeds, England

Original application July 7, 1945, Serial No. 603,616. Divided and this application July 15, 1947, Serial No. 761,004. In Great Britain July 17, 1944

3 Claims. (Cl. 241—228)

Coatings useful for heat-insulating, fire-resisting, acoustic and similar purposes can be produced by spraying asbestos fiber with or without other materials and with an adhesive (or ingredients which react to form an adhesive), onto the surface to be coated so as to form a cellular structure containing a large number of air cells. The method and general form of apparatus described in my Patents Nos. 1,990,584 and 1,990,585 have proved very effective for this purpose and are extensively used. In principle, this method involves the suspension of the asbestos in air and the spraying of the suspension. The apparatus described in my said patents includes a fan and the blades of this serve not only to propel a preformed suspension forwards but also to beat and open up any fiber bundles present in the suspension. The result is that dust is released and becomes suspended with the asbestos. It is impossible to trap this dust, with the further result that some of it escapes into the surrounding atmosphere during the spraying operation, and the operators have to wear masks.

Many attempts have been made to remove this drawback, including proposals to damp the fibers, but none has been successful and the problem is outstanding. In various attempts that I myself have made to eliminate dust by damping the fibers I found that the fibers always tended to coalesce into clots, which had a deleterious effect in that they produced irregular sprayed coatings. Moreover, even though considerable quantities of water were used, much dust was still produced during the spraying. In addition the clots tended to adhere to the internal parts of the spraying apparatus and materially interfered with the operation.

I have further found that if the fiber which is sprayed contains any dry particles dust will be produced during the spraying and will not be damped in the spraying. On the other hand non-uniform wetting is essential to make the fibers stick to one another and to the surface to be coated directly they strike it. In short, the irregular distribution of moisture which is an essential feature of the sprayed coating is a direct cause of dust formation if water is added in haphazard fashion to the asbestos with the object of damping the dust.

I have now found that I can achieve the desired result by mixing the asbestos with a predetermined quantity of water or other damping material in such a way that in the course of the mixing substantially every particle of asbestos is damped and the damping material is uniformly distributed throughout the asbestos. When I have uniformly damped all the particles I suspend the damped asbestos in air and spray the suspension.

Asbestos as it exists in nature consists of bundles of fiber adherent together and the process commonly known as coarsely opening the asbestos essentially involves the separation of these bundles from one another. In fully opened fiber, such as that which is commonly sprayed at the present time, most of the natural fiber bundles are broken up but the asbestos is not reduced to its ultimate fibers; rather this fully opened fiber consists essentially of small fiber bundles each containing, say, three or four ultimate fibers. By "particle" I mean each separate piece of asbestos, whether that is an ultimate fiber, a small fiber bundle or a fiber bundle of the size found in coarsely opened asbestos. Since there may be dust inside these latter fiber bundles it is necessary to force the damping material into the insides of the bundles, and I prefer to open them into smaller bundles before or during the mixing.

I prefer to add the requisite amount of water (or other damping material) roughly, and to mix the mass of fibers so thoroughly together in a mixing machine as to give even distribution of moisture throughout the mass. Various kinds of mixing machines may be used, but I prefer to use one of such a nature that during the mixing the fiber becomes (or is maintained) finely subdivided and is not transformed into hard lumps. When a mechanical mixer is used the water or the like may be added while the mixer is in operation or the asbestos may first be spread out on a flat surface and wetted with the necessary quantity of water and then be passed through the mixing machine to ensure that all the individual particles are damped and that the moisture is uniformly distributed.

The preferred form of mixing apparatus incorporates a rotary mixing drum adapted to carry the asbestos upwards as the drum rotates and a rotary brush mounted within the drum to engage the asbestos which is carried upwards and by a beating action to open up fiber bundles and fling the particles forwards through the drum to fall to the bottom and be carried upwards again. In operation there is always a mass of asbestos in the bottom of the drum and so long as the damping is not uniform the dryer particles in this will tend to adhere to the wetter particles. Fiber bundles are thus formed and continually carried to the brush which opens them and by flinging them back to the mass through the air brings about the mixing which leads to uniformity of damping. As the operation proceeds the damping becomes more and more uniform and the tendency to form bundles correspondingly decreases.

One machine of this kind is shown in the accompanying drawings in which:

Figure 1 is a plan of the apparatus and is partly in section;

Figure 2 is a section on the line II—II in Figure 1;

Figure 3 is an elevation, partly in section, on the line III—III in Figure 4;

Figure 4 is an enlarged view of part of the inner surface of the drum; and

Figure 5 is a section on the line V—V in Figure 4.

The apparatus shown comprises a rotary drum 1 in which the asbestos is placed and which contains a rotary brush 2. The drum 1 is carried by bearings 4 on a fixed hollow shaft 5 which is circular in section outside the drum and square in section inside the drum and which is clamped in pedestals 6 in the clamps 7.

The brush 2 is fixed to a shaft 10 which is carried in bearings in the ends of radial arms 11 which are fixed to the square part of the shaft 5. The shaft 10 also carries a pulley 12 by a belt 13 which also passes round a pulley 14 mounted on the shaft of an electric motor 15. This motor is also secured to the square part of the shaft 5 and the leads to it pass through the shaft. The motor 15 thus drives the brush, which is so placed that its bristles come into contact with the inner surface of the drum and in so doing exert on the drum a continuous torque which causes it to rotate. The drive thus transmitted is, of course, not positive, and the linear speed of the tips of the bristles is greater than that of the inner surface of the drum. This difference in linear speed is important, as the bristles must tear into the fiber carried upwards by the drum and fling it forwards as particles so that it passes through the drum as indicated by the arrows in Figure 2 and falls to the bottom again.

The drum is furnished with a lining 9, parts of which are bent inwards to form tongues or the like 8. These engage the mass of asbestos in the bottom of the drum and carry it upwards, and they also cooperate with the brush 2 in opening fiber bundles formed by uneven distribution of moisture. In effect the tongues provide a number of pockets with sharp edges, and as the bristles sweep by these the asbestos is torn out of them and the fiber bundles are opened by the tearing action both of the bristles and of the more slowly moving edges of the pockets.

The drum also contains a water spray nozzle 3 fed by a pipe 16 which also runs through the shaft 5. In operation the asbestos is introduced through a charging door 17 and the drum is then rotated, the water being introduced during the rotation, which is continued for long enough for the intimate mixing necessary to ensure uniform moistening to take place. It will be understood that the dimensions and speeds of the drum and brush may vary considerably, and to ensure a sufficient difference in linear speed it may even be necessary to retard the drum by an appropriate brake. As an example, the drum may be 3 feet in diameter, the brush may be driven at a high speed, say 100 R. P. M., and in consequence may drive the drum at 20 R. P. M., and the mixing may continue for three minutes, that is to say, for 60 revolutions of the drum. At the end of the mixing the moist asbestos is removed through the door 17.

Since the action of the brush on the asbestos may produce some dust it may be desirable to let the asbestos stay in the drum for a little time after the rotation has stopped in order that any such dust may settle and be moistened by contact with damp particles.

The angular position of the brush in the drum may be adjusted by turning the shaft 5 in the clamps 7.

A guard 18 is provided over the belt 13 and pulleys 12 and 14 to prevent them from being clogged by asbestos.

The quantity of the water or the like to be used is predetermined. The minimum quantity is determined by the necessity for coating substantially every particle of asbestos fiber and depends on the variety of the asbestos and its degree of sub-division, on which depends the amount of surface available for wetting. Very considerable reduction in the amount of dust is produced in most fibers by the addition of water equal to 2 or 3% of the asbestos fiber by weight, but we prefer to add a minimum of 5%. When the asbestos is crocidolite blue asbestos that is coarsely opened, that is to say, contains bundles of fiber in the state in which they are found in nature, 3% is the minimum to be added if dust is to be substantially eliminated. However, with the fiber in question the addition of only 2% water leads to some reduction in the amount of dust, a reduction, that is to say, that is great enough to represent a real advance over the existing processes. When the same fiber is fully opened, that is to say, has most of the fibers separated from one another as is the case in the asbestos that is commonly sprayed at the present time, the equivalent figures are higher, say 5% and 4% respectively.

As an example, the drum 1 shown in the drawings may be used for treating batches of asbestos, each some 6 or 7 pounds in weight, and water equal in weight to 7% of the asbestos may be introduced as a fine spray through the nozzle 3.

An upper limit is imposed on the amount of water that may be used by the fact that the whole fibrous mass must be dry enough to form a cellular coating when it is sprayed, i. e. the moisture must be retained on the surface of the individual fibers and must not fill the spaces between the fibers. It appears that it is adsorption of the moisture on the surface of the asbestos fiber that leads to success, and that the fibers can then adsorb relatively large quantities of moisture, i. e. up to 40% or even more of their own weight, in the case of crocidolite blue asbestos. What must be avoided is any free liquid such as could be squeezed out of the mass by applying pressure to it. With white asbestos fibers, which when damped tend to collapse in the sprayed coating more readily than blue asbestos fibers, it may not be possible to use the maximum quantity of water that can be adsorbed on the surface.

Instead of directly adding the water or other damping material to the fiber, it may be used to wet another material which is then mixed with the fiber; that other material may itself be fiber or may be sawdust, paper pulp or any other material capable of taking up moisture and giving it up again to the fiber to be damped. As an example, 20 parts of wet fiber containing half its weight of water can be mixed with 90 parts of dry fiber to give 100 parts of fiber and 10 parts of water.

If desired, a wetting agent may be used to facilitate the damping. Thus a small proportion of a powdered wetting agent, say 0.1% by weight of the fiber, may be mixed with the fiber or a soluble wetting agent may be dissolved in the water. The use of a wetting agent enables each particle to be coated by a smaller amount of water and so reduces the amount of water used.

One advantage obtained by the invention is that the moisture tends to lubricate the fiber and so to avoid further disintegration during the spraying process, which might in itself lead to the creation of more dust.

This is a division of my pending application Serial No. 603,616 filed July 7, 1945.

I claim:

1. An apparatus for separating the fibers of a mass of fibrous material and distributing moisture thereon comprising a rotary mixing drum turning on a horizontal axis and having closed ends and adapted to contain the material and moisture and having a supporting surface moving under the fibrous material in said mass, projections on the inner supporting surface of said drum engaging under the bottom of said mass and carrying the underlying portions of said fibrous mass upward with the movement of said drum, a supporting shaft projecting centrally into the drum from the end thereof, an arm extending outward from said supporting shaft and a rotary brush mounted on said arm to be adjustable to different positions at the upward moving side of said drum and having its periphery close to the said inner projections and means for driving said brush to engage and open the fibrous material as it is brought upward by said projections between said brush and said supporting surface, and to fling the separated fibers outward from said surface across the enclosed space and onto the fiber mass below to be subsequently again carried upward for further engagement by said rotary brush.

2. Apparatus for separating the fibers of a mass of fibrous material and distributing moisture thereon as set forth in claim 1 in which the rotary brush is driven by a motor carried by said supporting shaft within the said enclosure.

3. An apparatus for separating the fibers of a mass of fibrous material and distributing moisture thereon as set forth in claim 1 in which a nozzle supported by said shaft is located within the enclosure and acts to add moisture to the fibrous mass during the opening of the mass by the action of the brush so that as the fibrous surface area increases the moisture content of the fibrous mass will also increase.

NORMAN LOUIS DOLBEY.

REFERENCES CITED

The following references are of record in the file of this patent:

UNITED STATES PATENTS

| Number | Name | Date |
|---|---|---|
| 373,342 | Cornelius | Nov. 15, 1887 |
| 616,728 | Priest | Dec. 27, 1898 |
| 828,517 | Scoullar | Aug. 14, 1906 |
| 1,027,163 | Werner | May 21, 1912 |
| 1,241,702 | Binkley et al. | Oct. 2, 1917 |
| 1,514,044 | Harlan | Nov. 4, 1924 |
| 1,533,593 | Harlan | Apr. 14, 1925 |
| 1,634,385 | Rapp | July 5, 1927 |
| 1,762,241 | Pontoppidan | Jan. 10, 1930 |
| 1,964,259 | Green | June 26, 1934 |
| 2,199,137 | Magnani | Apr. 30, 1940 |
| 2,248,526 | Francois | July 8, 1941 |

FOREIGN PATENTS

| Number | Country | Date |
|---|---|---|
| 266,397 | Italy | July 29, 1929 |